(12) United States Patent
Levin

(10) Patent No.: US 11,400,937 B2
(45) Date of Patent: *Aug. 2, 2022

(54) METHOD FOR CONTROLLING A DRIVELINE OF A VEHICLE

(71) Applicant: VOLVO TRUCK CORPORATION, Gothenburg (SE)

(72) Inventor: Robin Levin, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/271,450

(22) PCT Filed: Aug. 30, 2018

(86) PCT No.: PCT/EP2018/073367
§ 371 (c)(1),
(2) Date: Feb. 25, 2021

(87) PCT Pub. No.: WO2020/043294
PCT Pub. Date: Mar. 5, 2020

(65) Prior Publication Data
US 2021/0301888 A1 Sep. 30, 2021

(51) Int. Cl.
*B60W 30/186* (2012.01)
*B60W 10/11* (2012.01)
(Continued)

(52) U.S. Cl.
CPC .......... *B60W 30/186* (2013.01); *B60W 10/02* (2013.01); *B60W 10/11* (2013.01);
(Continued)

(58) Field of Classification Search
CPC ................. B60W 2710/029; F16D 2500/7045
See application file for complete search history.

(56) References Cited

U.S. PATENT DOCUMENTS 4,576,263 A * 3/1986 Lane .................. F16D 48/066
477/72
6,095,946 A * 8/2000 Maguire ............... B60W 10/06
477/76
(Continued)

FOREIGN PATENT DOCUMENTS

CN        1958364 A      5/2007
CN      106015556 A     10/2016
(Continued)

OTHER PUBLICATIONS

China Office Action dated Sep. 29, 2021 in corresponding China Patent Application No. 201880096794.2, 17 pages.
(Continued)

*Primary Examiner* — Timothy Hannon
(74) *Attorney, Agent, or Firm* — Venable LLP; Jeffri A. Kaminski

(57) ABSTRACT

The invention relates to a method for controlling a driveline (10) of a vehicle (1), wherein the driveline (10) at least comprise a clutch (12) and a transmission (13), where the clutch (12) is adapted to connect the transmission to an propulsion unit (11). The method comprises the steps of;—estimating (105) an upcoming clutch temperature at least dependent on an imminent drive route, and if (106) the estimated upcoming clutch temperature is above a threshold value (T);—controlling (107) the driveline (10) in a critical heat mode, wherein in the critical heat mode the transmission (13) is controlled such that a clutch temperature increase is lower in comparison to a normal driveline control mode.

15 Claims, 2 Drawing Sheets

(51) Int. Cl.
*B60W 10/02* (2006.01)
*B60W 10/30* (2006.01)

(52) U.S. Cl.
CPC ......... *B60W 10/30* (2013.01); *B60W 2300/12* (2013.01); *B60W 2510/0291* (2013.01); *B60W 2552/20* (2020.02); *B60W 2554/406* (2020.02); *B60W 2555/20* (2020.02); *B60W 2710/021* (2013.01); *B60W 2710/029* (2013.01); *B60W 2710/1005* (2013.01)

(56) References Cited

U.S. PATENT DOCUMENTS

| | | | |
|---|---|---|---|
| 2009/0082174 A1 | 3/2009 | Ikeda et al. | |
| 2012/0261228 A1 | 10/2012 | Chen et al. | |
| 2016/0076644 A1* | 3/2016 | Ooshima | F16D 48/06 701/51 |
| 2016/0084375 A1* | 3/2016 | Yoon | F16H 61/688 701/55 |
| 2016/0281846 A1 | 9/2016 | Hippalgaonkar et al. | |
| 2017/0088137 A1 | 3/2017 | Yoon | |
| 2017/0120914 A1 | 5/2017 | Yoon | |
| 2017/0122431 A1 | 5/2017 | Cho | |
| 2017/0267240 A1* | 9/2017 | Cho | B60W 30/188 |
| 2018/0161716 A1 | 6/2018 | Li et al. | |
| 2018/0163855 A1* | 6/2018 | Cho | B60W 40/105 |

FOREIGN PATENT DOCUMENTS

| | | |
|---|---|---|
| CN | 106553635 A | 4/2017 |
| CN | 106641228 A | 5/2017 |
| CN | 106641234 A | 5/2017 |
| CN | 106641239 A | 5/2017 |
| EP | 1783393 A2 | 5/2007 |

OTHER PUBLICATIONS

International Search Report and Written Opinion dated May 15, 2019 in corresponding International PCT Application No. PCT/EP2018/073367, 7 pages.

* cited by examiner

METHOD FOR CONTROLLING A DRIVELINE OF A VEHICLE

CROSS-REFERENCE TO RELATED APPLICATIONS

This application is a U.S. National Stage application of PCT/EP2018/073367, filed Aug. 30, 2018, and published on Mar. 5, 2020, as WO 2020/043294 A1, all of which is hereby incorporated by reference in its entirety.

TECHNICAL FIELD

The invention relates to a method for controlling a driveline of a vehicle. The present invention also relates to a computer program product, a computer readable medium and a control unit for performing the method.

The invention can be applied in heavy-duty vehicles, such as trucks, buses and construction equipment. Although the invention will be described with respect to a truck, the invention is not restricted to this particular vehicle, but may also be used in other vehicles as mentioned above.

BACKGROUND

Vehicles, for example trucks, are commonly provided with a clutch arranged in-between a propulsion unit and a transmission of the vehicle. When the clutch is actuated during a start and/or stop of the vehicle and/or gearshifts of the vehicle, the clutch slips and heat is generated due to friction. Clutch actuation thus means heating of the clutch. If the clutch is overheated, the clutch functionality of the clutch might be reduced and the clutch wear is increased.

In US 2017/0122431 a shift control method for a vehicle equipped with a dual clutch transmission (DCT) is disclosed. The method suggests a shift control that is dependent on the current clutch temperature, and compares the current temperature with a reference value. A problem with this method is that the clutch temperature sometimes still becomes too high.

SUMMARY

An object of the invention is to provide a method, which reduce the risk for a clutch provided between a propulsion unit and a transmission of a vehicle to be overheated.

The object is achieved by a method for controlling a driveline of a vehicle according to claim 1. According to a first aspect the present invention solves the above identified objective by providing a method for controlling a driveline of a vehicle, wherein the driveline at least comprises a clutch and a transmission, wherein the clutch is adapted to connect and disconnect the transmission to a propulsion unit of the driveline and the method comprises the steps of;
  estimating an upcoming clutch temperature at least dependent on an imminent drive route,
and if the upcoming clutch temperature is predicted to be above a clutch temperature threshold value;
  controlling the driveline in a critical heat mode, wherein in the critical heat mode the transmission is controlled such that a clutch temperature increase is lower in comparison to a normal driveline control mode.

A clutch load and thereby temperature increase occurs during the state when the clutch is in a slipping state, i.e. when the input part and the output part is in contact and there is a relative movement between the input part and the output part. In any such situation, there will be generated heat due to the friction between the clutch plates. This is defined as clutch load. These situations occurs during any engagement and disengagement of the clutch, especially during a start of the vehicle and during gear speeds.

Due to the presented method the clutch temperature is estimated already in advance, whereby preventive measures to decrease the clutch temperature can be taken already before the temperature of the clutch has risen. The risk of overheating/overloading the clutch is decreased significantly by implementing the method compared to known methods.

In one embodiment of the method, the method step of estimating an upcoming clutch temperature at least on an imminent drive route is preceded by a method step of;
  detecting an increased clutch load, and only perform the method step of estimating an upcoming clutch temperature if an increased clutch load has been detected.

An increased clutch load can be detected in several ways, e.g. through detecting a clutch slippage, a repeated clutch slippage or a continuous clutch slippage within a timeperiod, such as 15 seconds, 30 seconds or 60 seconds, detecting an increasing temperature of the clutch. The clutch slippage can be compared to a threshold value for clutch slippage and e.g. be combined with the change behaviour, e.g. a repeated up and down gear change indicates an increased load. An additional example is that, the temperature can be compared with a temperature threshold value and/or a threshold value for temperature change gradient.

By using information about an imminent drive route in combination of the already known information of an ongoing increased clutch load, a more conscious control over the driveline can be applied, which reduces the risk for overheating/overloading the clutch and minimises the control of the driveline in the critical heat mode.

An exemplary clutch maximum temperature is between 200 and 400 deg. C for a dry clutch and about 170 deg. C for a wet clutch. A clutch temperature threshold value for the predicted upcoming clutch temperature could thereby be equal to the maximum temperatures or set about 5, 10 or 20% below the maximum temperature.

According to an exemplary implementation of the method the critical heat mode at least comprises one of;
  down-prioritizing gear shifts such that a current gear is used over a wider rpm interval than in a normal driveline control mode,
  controlling the transmission to skip gears,
  down-prioritizing comfort such that a gear shift of the transmission is performed with less clutch slippage than during a normal driveline control mode.
  controlling the clutch to only perform power cut-off shifts.

All the above mentioned measures have the effect that the clutch load is decreased, whereby less heat will be generated.

When the transmission skips gears it performs gearshift from e.g. second to fourth gear, or second to fifth gear or similar, instead of consecutive gear shifts, e.g. second to third gear, third to fourth gear, fourth to fifth gear, such gear skips reduces the number of engagements which generates heat. The same effect is achieved by controlling the clutch arranged between the propulsion unit and the transmission to perform the engagement and disengagement of the clutch, during gear shift, as swift as possible, instead of fine tuning in order to increase comfort, since the fine tuning increases the clutch slippage.

If the clutch is a double clutch in a double clutch transmission, the clutch can be controlled to only perform power cut-off shifts, in-different to the standard powershift normally performed with a double clutch transmission. A power cut-off shift can be performed with much less clutch slippage than a powershift.

In one aspect of the method step of estimating an upcoming clutch temperature is preceded by at least the step of;
predicting an imminent drive route.

The prediction of an imminent drive route can be made in any available way. For example, by GPS (or similar global navigation satellite system (GNSS) such as GLOSNASS; BDS, Galileo) and/or cellular triangulation or similar, can the position of the vehicle be provided with a high accuracy. Additional by positioning the vehicle location on a detailed map with road information, such as topography, curves of the road and traffic information, the imminent driving route and its effect on the vehicle can be estimated. The imminent driving route can be determined from e.g. a predetermined given route or a probability prediction based on historical vehicle, fleet or traffic information data. For the case of simplicity and explanation within this disclosure it is referred to a navigation device, wherein with a navigation device it is meant a device that has the capability to predict the imminent driving route, independently of the technology used for the prediction. The navigation device can be a local navigation device or a central navigation device which the vehicle accesses remotely. The navigation device can communicate with the other control units of the vehicle.

As a result, vehicles equipped with a navigation device can include algorithms to analyse road topography, curvature and other relevant data collected by the navigation device, to generate a driveline control scheme for the imminent driving route. In this context the algorithm could predict a road stretch with a high clutch load during the imminent driving route, e.g. due to a lot of predicted start and stops and/or gear changes in the imminent drive route.

The propulsion unit is normally a combustion engine. The clutch is thereby provided in-between the combustion engine and the transmission in order to engage and disengage the transmission from the combustion engine.

The time frame for the imminent drive route that is predicted is dependent on the thermal inertia of a clutch cooling system.

In one aspect of the method the prediction of an imminent drive route, at least comprises one of the steps;
determining a topography of the imminent drive route,
determining a traffic situation of the imminent drive route
determining a temperature along the imminent drive route, and
determining weather conditions along the imminent drive route.

The topography of the imminent drive route effects the frequency and number of gearshifts that is needed when the vehicle travels the imminent drive route. A varied topography will lead to a higher number of gearshifts and a lot of short downhill and uphill stretches will lead to a higher frequency of the gearshifts.

A high amount of curves, especially sharp curves in combination with a varied topography will also increase the load on the clutch.

The traffic situation along the imminent drive route can also effect the clutch load. For example, if there is a lot of traffic and queuing at the imminent drive route a lot of start and stops and clutch slippage is to be expected, whereby the load of the clutch increases. Especially queuing in an uphill slope generates a lot of heat, due to the high clutch slippage and repeated start procedures of the vehicle.

The temperature and weather along the imminent drive route can also effect the clutch load. For example, if there is temperature around zero degrees Celsius, and rain or snowfall, it is a high probability that the road surface will be slippery. A slippery road surface needs a more defensive driving pattern, which normally includes more clutch slippage during gearshifts and especially starts and stops of the vehicle, and therefore also a higher clutch load.

To estimate the upcoming clutch temperature additional parameters such as vehicle parameters can be utilized. Suitable vehicle parameters may be current clutch temperature, vehicle weight (gross combination weight, GCW), or vehicle rolling resistance.

For example, the clutch load (and thereby heat) will be much higher on a truck with a heavy loaded trailer, then a truck with a trailer with light load or no trailer or load at all. An additional parameter is the present clutch temperature, which effects the clutch temperature during the imminent driving route.

In one aspect of the method the clutch is a wet clutch and further comprises a clutch cooling system, in which an oil is arranged to flow and disperse heat from the clutch and the method step of controlling the driveline in a critical heat mode further comprises one of;
increasing the flow of the oil in the clutch cooling system,
reducing a temperature of the oil in the clutch cooling system.

An exemplary effect of the above two measures of increasing the flow and reducing the temperature of the oil in the clutch cooling system is that an increased heat dissipation from the clutch can be achieved. A high heat dissipation will reduce the overall clutch temperature.

In one aspect of the method the clutch cooling system is further connected to a driveline cooling system, which at least comprises a radiator, a cooling agent pump and a heat exchanger, all in fluid connection with each other such that the cooling agent pump can circulate a cooling agent in the driveline cooling system, wherein the heat exchanger is provided to disperse heat from the clutch cooling system to the driveline cooling system, wherein the cooling agent flow through the radiator can be controlled through a valve dependent on temperature of the cooling agent, and the valve is set to open when a temperature of the cooling agent is above a first opening temperature, and the method step of reducing the temperature of the oil in the clutch cooling system is achieved by the method steps of;
controlling the valve to open at a second opening temperature, wherein the second opening temperature is lower than the first opening temperature.

For example, the first opening temperature may be about 82-92° C.

In one exemplary embodiment, the second opening temperature is between 70 and 80° C., and preferably between 72 and 78° C. and more preferably between 74 and 76° C. In another exemplary embodiment is the second opening temperature equal to the ambient temperature of the vehicle. By setting the second temperature as the opening temperature, an maximum cooling effect is realised immediately.

An exemplary effect of introducing a second opening temperature such that the valve controlling the cooling agent flow to the radiator at a lower temperature the temperature control of the oil in the clutch cooling system can be better controlled and held at a lower temperature, which in turn has the same effect of the clutch temperature.

A driveline cooling system normally comprises a fan arranged to direct air onto the radiator, wherein the method step of reducing the temperature of the oil in the cooling system is further achieved by the method steps of;
increasing the power of the fan.

The power of the fan is normally increased by that the speed of the fan is increased, such that a higher cooling effect on the radiator is achieved. This has the exemplary effect of increased control of the cooling agent temperature in the driveline cooling system and thereby also increased control of the temperature of oil in the clutch cooling system and ultimately increased heat dissipation from the clutch.

In one aspect of the method, the fan is adapted to start when the temperature of the cooling agent is above a first start temperature, wherein the method step of reducing the temperature of the oil in the cooling system is further achieved by the method steps of;
  controlling the fan to start at a second start temperature, which is lower than the first start temperature.

An exemplary effect of having a second start temperature for the fan is correspondent to the effect of having a second opening temperature of the valve to the radiator, i.e. increased temperature control.

An exemplary second start temperature is between 75 and 85° C. and preferably between 77 and 83° C. and more preferably between 79 and 81° C. In another exemplary embodiment is the second start temperature equal to the ambient temperature of the vehicle. By setting the second temperature as the opening temperature, a maximum cooling effect is realised immediately.

Normally the driveline cooling system comprises a fluid pump which is arranged to circulate the cooling agent in the clutch cooling system 100, wherein in one aspect of the method, it further comprises the steps of;
  increasing the flow of the cooling agent in the driveline cooling system Commonly the cooling agent pump of the driveline cooling system is provided with at least a low speed and high speed mode, where the low speed mode has a flow that is about 50% lower than in the high speed mode. The coolant fluid pump in the driveline cooling system is normally controlled dependent on engine parameters, such as engine torque, engine rpm and coolant temperature in the engine. However, according to this aspect of the method the coolant fluid pump is instead controlled dependent on the clutch temperature through activation of the critical heat control mode of the driveline.

In one aspect of the method, the method step of registering an increased temperature of the clutch is performed by;
  measuring the temperature directly at the clutch or
  measuring the temperature of the oil in the clutch cooling system, or
  determining the temperature of the clutch dependent on the input speed, the output speed and the transferred torque.

One aspect of this disclosure concerns a computer program product comprising program code means for performing the steps of any aspect of the method, when the program runs on a computer.

One aspect of this disclosure concerns a computer readable medium carrying a computer program comprising program code means for performing the steps of any aspect of the method, when the program product runs on a computer.

One aspect of this disclosure concerns a control unit for controlling a driveline of a vehicle, the control unit being configured to control the driveline by performing the steps of the method according to any aspect of the method.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
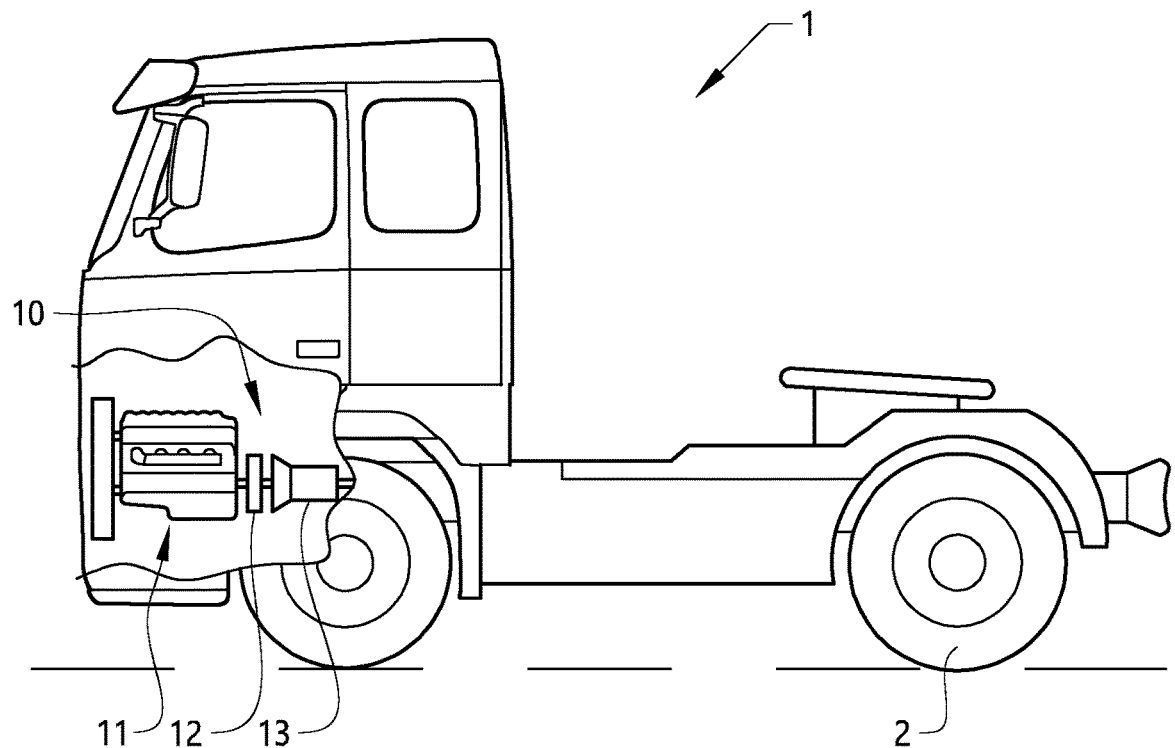
FIG. 1 is a side view of a truck being provided with driveline controlled according to the method of claim 1 of the present disclosure disclosed.

The present invention will now be described more fully hereinafter with reference to the accompanying drawings, in which exemplary embodiments of the method are shown. The method may however be embodied in many different forms and should not be construed as limited to the embodiments set forth herein; rather, these embodiments are provided for thoroughness and completeness, and full convey the scope of the invention to the skilled addressee. Like reference characters refer to the like elements throughout the description.

FIG. 1 schematically illustrates a truck 1 with a driveline 10, on which the method of claim 1 can be applied. In FIG. 1 the main parts of the driveline 10 is also disclosed; the propulsion unit 11, the clutch 12, the transmission 13 and the drive wheels 2.

Figure 2:
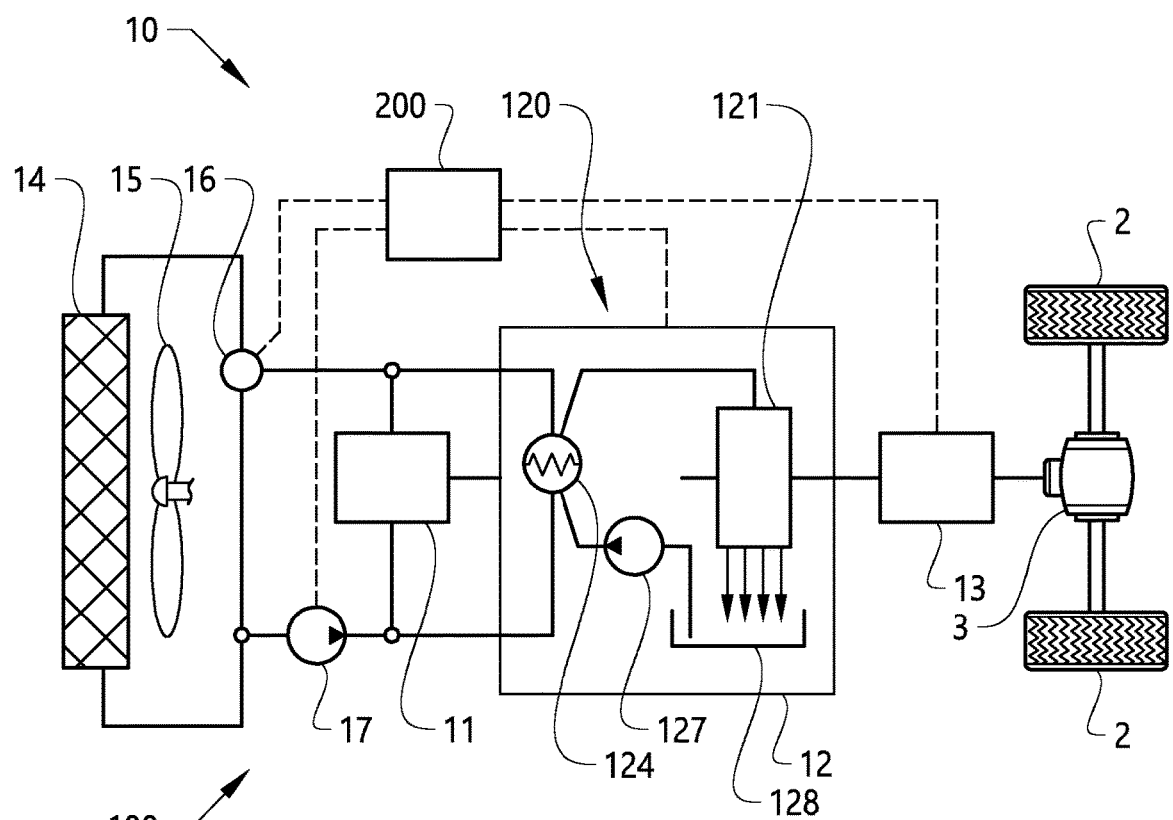
FIG. 2 is a schematic drawing of a driveline controlled according to the method of claim 1 of the present disclosure disclosed.

FIG. 2 schematically illustrates the driveline 10 of the truck 1. The driveline 10 is provided with a propulsion unit 11, a clutch 12 and a transmission 13, whereby the clutch 12 is provided to engage and disengage the propulsion unit 11 to/from the transmission 13.

Further can the differential gear 3 and the drive wheels 2 of the driveline be seen in the FIG. 2.

The exemplary driveline 10 in FIG. 2 further disclose a driveline cooling system 100, which comprises a radiator 14, a pump 17, and a valve 16 and cooling agent conduits, wherein the cooling agent conduits sets the radiator 14, the pump 17 and the valve 16 in fluid connection with each other. The driveline cooling system 100 further comprise a fan 15 arranged to direct air onto the radiator 14.

The clutch 12 comprises the clutch unit 121 and a clutch cooling system 120, which is arranged to dissipate heat from the clutch unit 121. The clutch cooling system 120 comprises an oil pump 127, a heat exchanger 124 and an oil sump 128, the clutch cooling system 120 is arranged such that the pump 127 pumps oil from the oil sump 128 into the heat exchanger 124 and therefrom into the clutch unit 121, from which the oil is returned into the oil sump 128.

The heat exchanger 124 of the clutch cooling system is further connected to the cooling agent conduits of the driveline cooling system 100, such that the cooling agent of the driveline cooling system can absorb the heat from the oil in the clutch cooling system 120 through the heat exchanger 124.

In the exemplary and schematically disclosed driveline 10 of FIG. 2 is further a control unit 200 disclosed. The control unit 200 is connected to the local controllers of the controllable parts of the driveline 10, such that it can communicate with them. The connection can be wired or wireless.

The exemplary driveline 10 in FIG. 2 discloses a wet-clutch 12. A dry-clutch would not be provided with the clutch cooling system 120. The aspects of the method, which does not involve any control of the clutch cooling system 120 is applicable also on driveline 10 provided with a dry-clutch.

Figure 3:
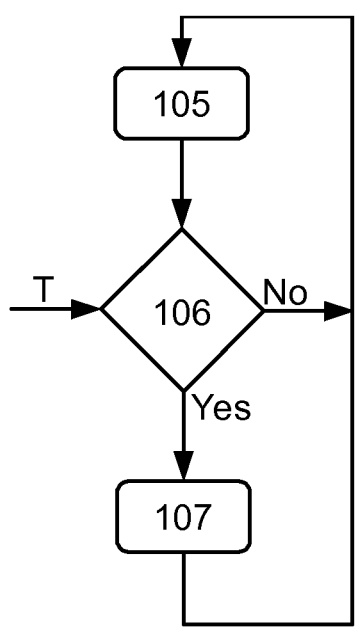
FIG. 3 is a flowchart of an embodiment of the method disclosed.

FIG. 3 discloses a flowchart of an exemplary embodiment of the method on a driveline 10. According to the method an upcoming clutch temperature is estimated 105 based at least on an imminent driving route.

The estimated upcoming clutch temperature is compared 106 to a clutch temperature threshold value T, whereby if the estimated upcoming clutch temperature is below the clutch temperature threshold T, the method is repeated from the beginning, but if the estimated upcoming clutch temperature is above the clutch temperature threshold T, the driveline 10 is controlled 107 in a critical heat mode.

In the critical heat mode the driveline 10 is controlled to reduce heat-increase in the clutch 12. The critical heat mode reduces the heat-increase in the clutch 12 predicted for the imminent driving route, by implementing one or several clutch heat-increase reducing measures, which is not present in a normal driveline control mode. Which measures and which combination of measures that is implemented is dependent on how much the upcoming clutch temperature exceeds the clutch temperature threshold value T. The heat-increase reducing measures can be divided into at least two categories; clutch actuation measures and clutch cooling measures.

Exemplary measures relating to clutch auctions are:
down prioritizing gear shifts such that a current gear is used over a wider rpm interval than in a normal driveline control mode,
controlling the transmission to skip gears,
down-prioritizing comfort such that a gear shift of the transmission is performed with less clutch slippage than during a driveline control mode,
controlling the clutch to only perform power cut-off shifts, i.e. only possible for DCT-applications.

All the above measures reduces the clutch load and thereby reduces the heat-increase of the clutch 12 when the vehicle 1 passes the imminent drive route.

Exemplary measures relating to relating to clutch cooling are:
increasing the flow of the oil in the clutch cooling system,
reducing a temperature of the oil in the clutch cooling system,
controlling the valve to open at a second opening temperature, wherein the second opening temperature is lower than the first opening temperature,
increasing the power of the fan,
controlling the fan to start at a second start temperature, which is lower than the first start temperature.

All the above measures reduces the heat-increase of the clutch 12 in that they directly or indirectly increases the cooling of the clutch unit 121 and thereby reduces the heat-increase of the clutch 12 when the vehicle passes the imminent drive route.

One or a plurality of critical heat measures can be implemented to reduce the heat-increase in the clutch 12 during the imminent driving route. One or a plurality of clutch actuation measures can be combined with one or a plurality of clutch cooling measures and vice versa.

Figure 4:
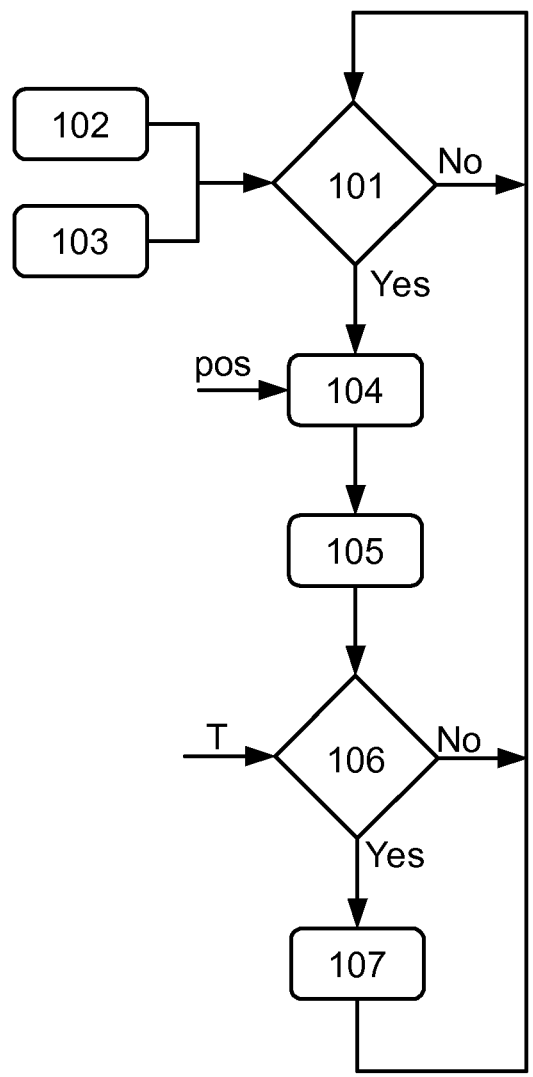
FIG. 4 is a flowchart of an embodiment of the method disclosed.

In FIG. 4 a flowchart for an exemplary alternative implementation of the method is disclosed in which additional optional method steps are incorporated. The method disclosed in the flowchart of FIG. 4 differs from the method disclosed by the flowchart in FIG. 3 in that it comprises the method steps:
continually monitor 101 the clutch 12 to detect 102 a repeated clutch slippage within a specified time-period, or to detect 103 an increasing clutch temperature, wherein if any of a repeated clutch slippage or increasing clutch temperature is detected an upcoming clutch temperature is estimated 105 based at least on an imminent driving route and/or
method step of predicting 104 the imminent driving route.

The method steps 101 (including method step 101 and/or 103) and method step 104 can be incorporated in the method alone or as shown together with the other.

If a clutch slippage or an increasing clutch temperature does not reach their respective threshold values the method keeps monitoring the clutch until the relevant threshold value is reached, whereby the next method step can be performed.

For the prediction, at least a position pos is used to identify the position of the vehicle on a map. The prediction of the imminent driving route can be made locally by a control unit/processor of the vehicle 1 or centrally and communicated to the vehicle.

In one exemplary embodiment of the method the critical heat mode is introduced step wise, where the critical heat mode is provided with at least two different priority modes. In a low priority mode that is activated first, only measures that does not affect the driving comfort are activated. Such measures could for example be the measures relating to clutch cooling.

Because clutch actuation measures affects the driving behaviour of the vehicle, these will be experienced as more disturbing the comfort, whereby it is suggested that these measures are introduced first in a high priority mode, if the low priority mode measures are deemed not to be sufficient. The high priority mode could be introduced in situations, where a high clutch temperature is imminent or when the expected clutch temperature is above the temperature threshold value, despite the low priority mode measures.

In one exemplary embodiment, all the heat-increase reducing measures can be prioritised dependent on how comfort disturbing they are. Whereby their activation can made dependent on their priority order and the expected clutch temperature.

It is to be understood that the present invention is not limited to the embodiments described above and illustrated in the drawings; rather, the skilled person will recognize that many changes and modifications may be made within the scope of the appended claims.

The invention claimed is:
1. A method for controlling a driveline of a vehicle, wherein the driveline at least comprises a clutch and a transmission, where the clutch is adapted to connect and disconnect the transmission to a propulsion unit, wherein the method;
estimating an upcoming clutch temperature at least dependent on an imminent drive route,
and when the estimated upcoming clutch temperature is above a threshold value;
controlling the driveline in a critical heat mode, wherein in the critical heat mode the transmission is controlled such that a clutch temperature increase is lower in comparison to a normal driveline control mode.

2. The method according to claim 1, wherein the method further comprises the steps of;
   detecting an increased clutch load, and the method step of estimating the upcoming clutch temperature is only performed when the increased clutch load has been detected.

3. The method according to claim 1, wherein the critical heat mode, comprises at least one of the steps;
   down prioritizing gear shifts such that a current gear is used over a wider rpm interval than in the normal driveline control mode,
   controlling the transmission to skip gears,
   down-prioritizing comfort such that a gear shift of the transmission is performed with less clutch slippage than during the driveline control mode,
   controlling the clutch to only perform power cut-off shifts.

4. The method according to claim 1, wherein the method step of estimating the upcoming clutch temperature is preceded by at least the step of;
   predicting the imminent drive route.

5. The method according to claim 4, wherein the method step of predicting the imminent drive route, at least comprises one of the steps;
   determining a topography of the imminent drive route,
   determining a traffic situation of the imminent drive route
   determining a temperature along the imminent drive route, and
   determining weather conditions along the imminent drive route.

6. The method according to claim 1, wherein the clutch further comprises a clutch cooling system, in which an oil is arranged to flow and disperse heat from the clutch and the method step of controlling the driveline in the critical heat mode further comprises;
   increasing the flow of the oil in the clutch cooling system,
   reducing a temperature of the oil in the clutch cooling system.

7. The method according to claim 6, wherein the driveline comprises a driveline cooling system, which at least comprises a radiator, a cooling agent pump and a heat exchanger in fluid connection with each other such that the cooling agent pump can circulate a cooling agent in the driveline cooling system, wherein the heat exchanger is provided to disperse heat from the clutch cooling system to the driveline cooling system, wherein the cooling agent flow through the radiator can be controlled through a valve dependent on temperature of the cooling agent, and the valve is set to open when a temperature of the cooling agent is above a first opening temperature, and a reduced cooling temperature is achieved by the method steps of;
   controlling the valve open at a second opening temperature, wherein the second opening temperature is lower than the first opening temperature.

8. The method according to claim 7, wherein the second opening temperature is essentially equal to the ambient temperature of the vehicle, alternatively between 70 and 80° C.

9. The method according to claim 7, wherein the driveline cooling system further comprises a fan arranged to direct air onto the radiator, wherein a reduced cooling temperature is further achieved through the method step of;
   increasing the power of the fan, in order to increase air flow through the radiator.

10. The method according to claim 7, wherein the driveline cooling system further comprises a fan arranged to direct air onto the radiator, and the fan is adapted to start when the temperature of the cooling agent is above a first start temperature, wherein a reduced cooling temperature is further achieved through the method step of;
    controlling the fan to start at a second start temperature, which is lower than the first start temperature.

11. The method according to claim 10, wherein the second start temperature is essentially equal to the ambient temperature of the vehicle, alternatively between 75 and 85° C.

12. The method according to claim 6, wherein the clutch cooling system comprises a fluid pump, which is arranged to circulate the cooling agent in the clutch cooling system, wherein the method further comprises the steps of;
    increasing the flow of the cooling agent in the driveline cooling system.

13. The method according to claim 1, further comprising registering of an increased temperature of the clutch by:
    measuring the temperature directly at the clutch or
    measuring the temperature of a clutch cooling agent.

14. A non-transitory computer readable medium carrying a computer program comprising program code for performing the steps of claim 1, when the program code runs on a computer.

15. A control unit for controlling a driveline of a vehicle, the control unit being configured to control the driveline by performing the steps of the method according to claim 1.

* * * * *